Oct. 13, 1953        F. E. WEICK        2,655,326
GUST-ALLEVIATING FLAP SYSTEM FOR AIRCRAFT
Filed Dec. 4, 1947        2 Sheets-Sheet 1
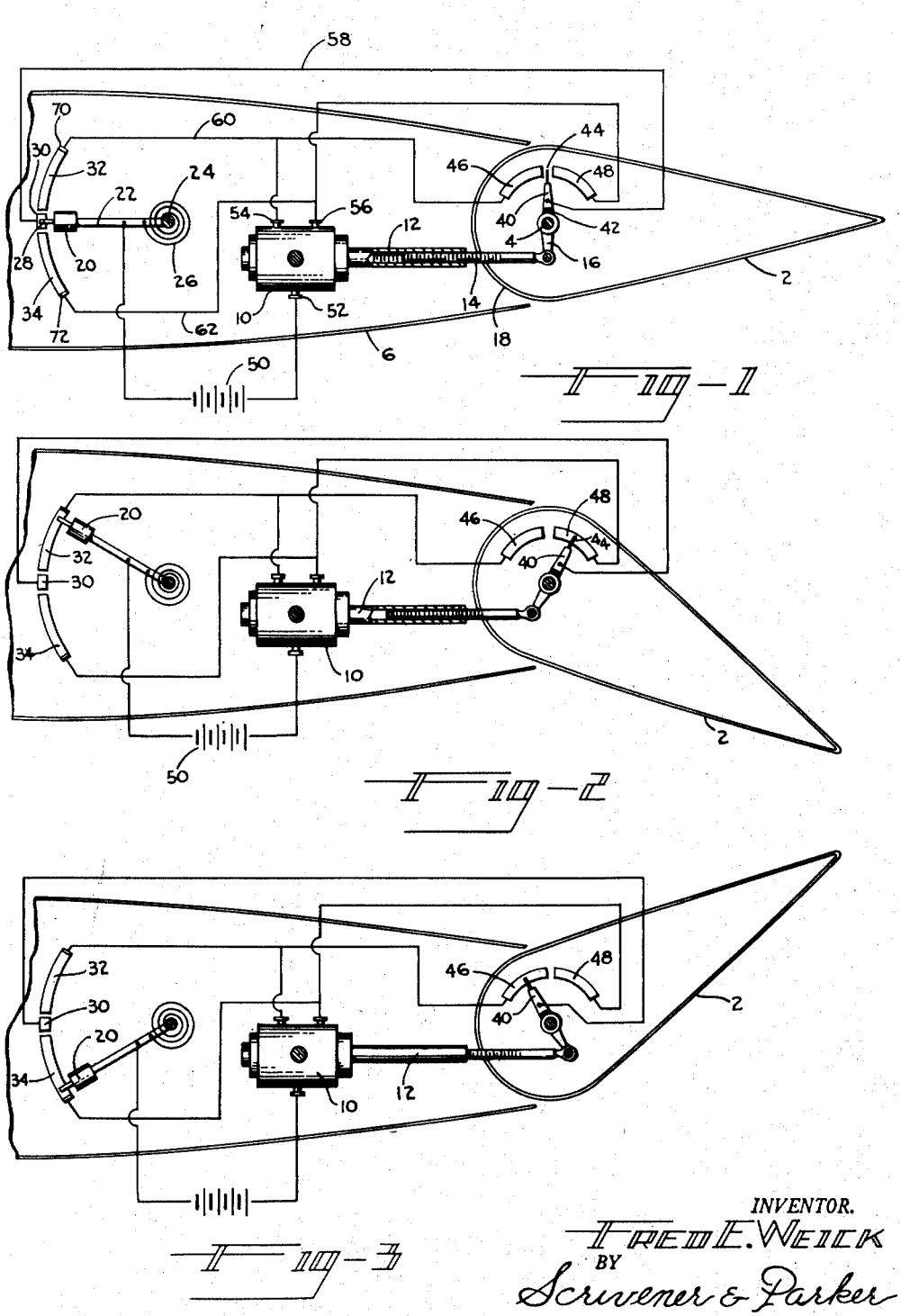
INVENTOR.
Fred E. Weick
BY
Scrivener & Parker

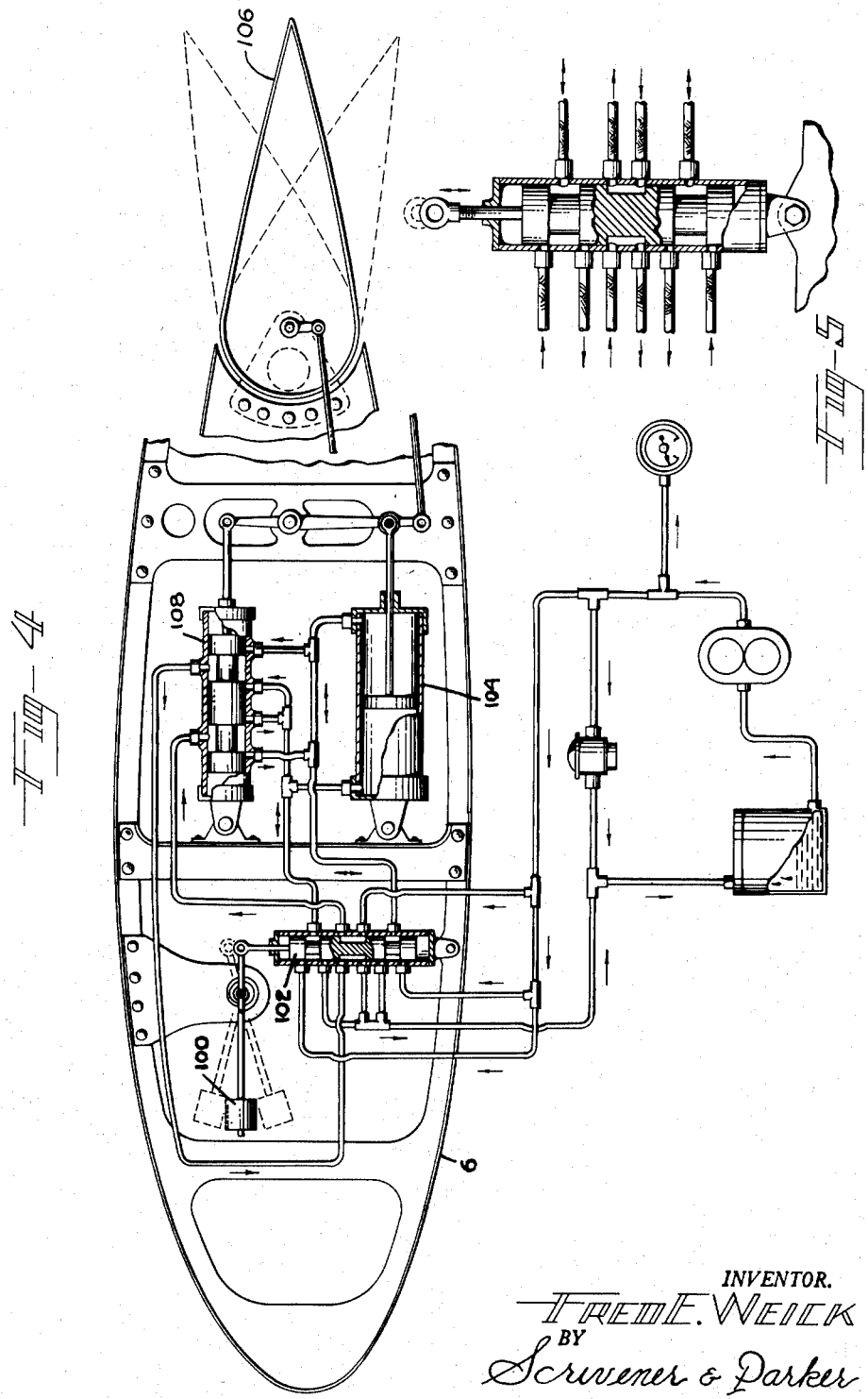

UNITED STATES PATENT OFFICE 2,655,326

GUST-ALLEVIATING FLAP SYSTEM FOR AIRCRAFT

Fred E. Weick, Calvert Hills, Md., assignor to Engineering & Research Corporation, Riverdale, Md., a corporation of Maryland Application December 4, 1947, Serial No. 789,707

2 Claims. (Cl. 244—76)

This invention relates broadly to aircraft and to the control thereof in flight. More particularly, the invention has to do with the maintenance of steady flight without the sudden vertical and rolling accelerations caused by the effect on the aircraft of so-called "gusts." A study of the effect of gusts on aircraft may be found in Report No. 692 and Technical Note 1320 of the National Advisory Committee for Aeronautics.

There are advantages to all types of flying of steady flight under gusty air conditions. For example, steady flight of commercial aircraft would greatly increase the comfort of passengers. It is also important that passengers in commercial aircraft and personnel of military aircraft arrive at their destination in good physical and mental condition. Steady flight during bomb dropping operations is also of great importance. A very important advantage of steady flight, which has to do with aircraft of all types, is that it permits a greater useful load to be carried by an aircraft or, conversely, permits the aircraft to be designed and built with less strong, and consequently lighter, structural elements. This is due to the fact that the wing of an aircraft, which is subject to sudden vertical accelerations due to gusty conditions, must be designed to withstand stresses due to sudden accelerations of such type. If these stresses are eliminated or reduced by preventing the vertical accelerations due to gusts the aircraft may obviously carry greater loads or may be designed with lighter wing structural members.

I have heretofore proposed to attenuate the vertical acceleration of aircraft due to gusts by changing the lift of the wings of the aircraft sufficiently and at such time as to partially counteract the effect of the gust. This early proposal, which was made jointly with Eastman N. Jacobs, contemplated the provision of a trailing edge flap forwardly overbalanced about its pivot axis but otherwise freely floating except for means such as a spring to balance the air load and restrain the flap to a position within the airfoil contour of the wing during normal, steady flight. In operation, and assuming an upward gust which increases the angle of attack and the lift of the wing and causes upward acceleration thereof, the inertia of the overbalancing weight will cause the flap to move upwardly, reducing the lift of the wing and thus preventing or forestalling the full upward acceleration. The effectiveness of such overbalanced gust-alleviating flaps was investigated by the National Advisory Committee for Aeronautics and it was found that the flaps had the effect of reducing the maximum acceleration increment by 39% for a typical severe gust. A report of these tests may be found in National Advisory Committee for Aeronautics Technical Note No. 745.

It will of course be apparent that a gust-alleviating flap system which would be more effective than that described above would be very desirable and would encourage the use of such systems, and it has been the principal object of my invention to provide a gust-alleviating flap system which would be operative to substantially counteract the effect of a gust on the wing of an aircraft and thus substantially prevent the vertical acceleration of the aircraft due to the gust.

It has also been found that a disadvantage of gust-alleviating flap systems of the described type is the added weight introduced by the overbalancing mass, it being well understood and recognized that reduction in weight is of first importance in aircraft design. It has therefore been an additional important object of this invention to provide a gust-alleviating flap system of the described type which would require only a mass of almost negligible weight, while performing all of the functions of known systems.

By this invention I have provided means for effecting these objects and such means comprise essentially the provision in a gust-alleviating flap system of a small mass which is freely suspended relatively to the wing for vertical movement with respect thereto when the wing is suddenly vertically accelerated. The movement of this mass is caused to operate power means which moves the flap in the proper direction to counteract the effect of the gust and substantially eliminate the vertical acceleration of the wing.

A gust-alleviating flap system according to the present invention is disclosed in the drawings, in which Fig. 1 is a cross-sectional view of an aircraft wing having a gust-alleviating flap and operating means for the flap according to the invention;

Fig. 2 is a view similar to Fig. 1 but illustrating the positions of the parts during downward operation of the flap;

Fig. 3 is a view similar to Fig. 1 but illustrating the positions of the parts during upward operation of the flap;

Fig. 4 is a view similar to Fig. 1 but disclosing a pneumatic or hydraulic system for operating the gust-alleviating flap; and Figure 5 is an enlarged view, partly in cross section, of the control valve for the pneumatic or hydraulic system shown in Figure 4.

A gust-alleviating flap system according to the invention is disclosed in the drawings and comprises the gust-alleviating flap 2 which is mounted for vertical angular movement about an axis 4 located adjacent its leading edge. The flap 2 forms the rearward part of the airfoil cross-section of a wing 6 of an aircraft, only part of the wing being shown in the drawings in order to simplify the disclosure and permit enlargement of the parts which are shown.

Means are provided by the invention for moving the gust-alleviating flap upwardly or downwardly about its pivot axis 4 when the wing is given vertical acceleration by movement into a gusty area. Such means are operable to cause the amount of movement of the flap to be sufficient substantially to counteract vertical acceleration due to the gust, regardless of the violence or duration of the gust and regardless of whether it causes upward or downward movement of the wing. These means are also operable to return the gust-alleviating flap to its normal position within the airfoil contour of the wing upon cessation of vertical acceleration of the wing, and regardless of whether the vertical acceleration has been in an upward or downward direction.

The means which are provided by the invention for operating the flap 2 comprise an electric motor 10 having a rotatable armature shaft 12 which is internally threaded to receive the external threads of an operating rod 14 which extends rearwardly from the motor 10 to engage the lower end of an operating lever 16 which is attached to the pivot shaft 4 of the flap 2. The motor 10 is preferably mounted within the wing 6 forwardly of the leading edge of flap 2 and the operating rod 14 extends through a slot 18 in the leading edge wall of the flap 2. It will be apparent that if clockwise rotation is imparted to armature shaft 12 by operation of the motor 10, the operating rod 14 will be moved in one direction, for example forwardly, to move the flap 2 downwardly about its pivot shaft 4, while if the armature shaft is rotated in a counter-clockwise direction the operating rod will be moved rearwardly, moving the flap 2 upwardly about pivot 4.

The control means for the motor 10 comprise a mass 20 having substantially negligible weight with respect to the weight of the aircraft, which is mounted on the free end of an arm 22 the other end of which is mounted for free rotation about a pivot axis 24 which extends longitudinally of the wing in order that the weight 20 may have free, vertical, angular movement about shaft 24 and with respect to the wing. A spring 26 which is attached at its one end to a fixed part of the wing and at its other end to arm 22, holds the arm in a normally horizontal position as shown in Fig. 1 of the drawings, from which position the arm and weight may move freely about shaft 24 against the force of spring 26. An electrical contact member 28 is attached to weight 20 and extends therefrom as a continuation of arm 22 and is therefore normally in a horizontal position. This contact member is normally in engagement with a fixed contact member 30 of small, arcuate extent which, at its opposite ends, is spaced or insulated from an elongated upper arcuate contact member 32 and an elongated lower arcuate contact member 34. It will be seen that as the weight 20 and arm 22 move about pivot axis 24 above and below their normal horizontal position, the contact member 28 will engage either the upper arcuate member 32 or the lower arcuate contact member 34. In its normal position the contact member 28 will rest on the short, central contact 30 which is insulated from contacts 32 and 34.

Referring now to switch means carried by the flap 2, such means comprise a contact arm 40 which is carried by and rotatable with the flap and is preferably attached to the operating lever 16, extends upwardly therefrom and is insulated therefrom and from ground at 42. Contact arm 40 has an upwardly-extending contact member 44 which, in the normal, undeflected position of flap 2, lies between and out of contact with two arcuate contact members 46, 48 which lie on opposite sides thereof whereby the contact member 44 will engage one or the other as the flap is moved upwardly or downwardly. In the embodiment of the invention disclosed in the drawings, contact member 44 will engage contact 46 on upward movement of the flap and will engage contact member 48 on downward movement thereof. Contacts 46 and 48 are arcuately elongated in order that the contact member 44 will remain in contact therewith regardless of the extent of movement of the flap away from its normal, undeflected position.

Referring now to the electrical connections, it will be seen that a battery 50 is connected at its one terminal to the weight-carrying arm 22 and at its other terminal to one of the terminals 52 of the reversible electric motor 10. The motor has two other terminals 54 and 56 and when the electric circuit is completed through terminal 54, the motor is so energized that the armature thereof rotates in a direction to cause the flap 2 to move downwardly as shown in Fig. 2, while completion of the circuit through terminal 56 causes upward movement of the flap as shown in Fig. 3. The short, central contact 30 with which the weight-carried movable contact 28 is normally in engagement is connected by lead 58 to the contact arm 40 at the flap. The upper elongated contact member 32 is connected by lead 60 to motor terminal 54 and to arcuate contact 46 which forms part of the control means at the flap. Lower elongated arcuate contact 34 is connected by lead 62 to motor terminal 56 and also to the arcuate contact 48 at the flap.

The operation of the disclosed system will now be described. In normal, steady flight of the aircraft, the parts will be in the position shown in Fig. 1. In this condition the weight 20 will be held in its normal, neutral position by spring 26 and the movable contact 28 will therefore be in engagement with the fixed, central contact 30. The flap 2 will be in its normal position within the airfoil contour of the wing and the contact 44 will therefore be positioned between and out of contact with the fixed contacts 46, 48. All circuits through the motor 10 will be open in this condition and position of the parts and there will be no movement of the motor armature or of the flap 2. If it is assumed that the wing 6 encounters a downwardly-moving gust of wind, the wing will be given a downward acceleration. The inertia of mass 20 will cause it to lag behind the downward movement of the wing and the parts will therefore assume the relative positions shown in Fig. 2, in which the weight 20 has moved upwardly with respect to the wing and is moved into engagement with the upper contact member 32. This causes the completion of electric circuit from the battery 50 through movable arm 22, movable contact 28, fixed contact 32 and leads 60 to motor terminal 54, causing the motor armature to be rotated in such a direction as to move the flap downwardly as shown in Fig. 2. The downward movement of the flap will cause contact arm 40 at the flap to move into engagement with arcuate contact 48. The downward movement of the flap will increase the lift of the wing 6 and thereby counteract and stop the downward acceleration of the wing due to the gust. When this occurs the weight 20 will move back to its central position in which movable contact 28 engages the central, fixed contact 30. This will cause a circuit to be completed from the battery through movable arm 22, movable contact 28, fixed contact 30, lead 58, movable switch arm 49, fixed contact member 48 and motor terminal 56, thereby causing the motor to reverse its direction of movement, it being remembered that when movable contact 28 moves out of engagement with fixed contact 32 upon movement of the weight to a central position, the circuit through motor terminal 54 will be opened. Reversal of direction of rotation of the motor will cause the flap to move upwardly from its position in Fig. 2 and this movement will continue until contact member 44 on the end of operating arm 40 at the flap moves out of engagement with contact 48 to the neutral position shown in Fig. 1. When this occurs the described circuit through motor terminal 56 will be broken and movement of the flap will stop.

Upward acceleration of the wing because of encounter with a gust having upward movement will cause such a relative movement between the movable weight 20 and the wing that the weight will move relatively downwardly, causing the parts to assume the relative positions shown in Fig. 3 in which the movable contact 28 engages the lower fixed arcuate contact 34. When this occurs, a circuit will be completed through leads 62 and motor terminal 56, causing the flap 2 to be moved upwardly as shown in Fig. 3. This movement of the flap will move movable contact 44 at the flap into engagement with fixed contact 46 in order that when the weight moves back to its central position upon cessation of vertical acceleration of the wing, a circuit will be completed through motor terminal 54, causing reversal of the motor to move the flap back to central position. It is believed that the sequence of operations in connection with an upward movement of the flap will be perfectly clear to those skilled in the art from this description and the description in connection with a downward movement of the flap.

At the outer ends of the arcuate contacts 32, 34 there are provided stop members 70, 72, respectively. If the wing is given violent, vertical acceleration in either direction by a particularly violent gust, the movable weight 20 will be moved to such an extent that it will engage one or the other of these stops and will therefore remain in engagement with one or the other of the contact members 32 or 34, thereby maintaining the electric circuit closed through contact 32 or 34 until counteraction of the vertical acceleration by operation of the flap causes the weight to move back to its normal, central position.

My invention contemplates generally the provision of power-operated means for actuating the gust-alleviating flap. Such power-operated means may be other than electrical and, for example, may be hydraulic, pneumatic, inertia or otherwise. As an example of such non-electrical power-operated means, I have disclosed in Fig. 4 a pneumatic or hydraulic system in which the vertical movement of a freely suspended mass 100 with respect to the wing 6 causes the operation of a control valve 102 which, in turn, causes the operation of a hydraulic or pneumatic motor 104 which is connected to the flap 106 to move the same upwardly or downwardly out of the airfoil contour of the wing. Valve means 108 are also provided for causing the flap to return to normal position within the airfoil contour of the wing when the freely suspended mass returns to its normal, central position.

In the described embodiments of the invention the flap is disclosed as having a normal position within the airfoil contour of the wing, which is the position which it will occupy during normal cruising. The flap is equally operative for the purposes of the invention when it is in other positions, however. For example, if the flap is used to increase lift as well as for gust-alleviation, it will be depressed in landing and take-off and will operate as a gust-alleviating flap, in the manner taught by this invention, from such a depressed position.

While I have described and illustrated but one embodiment of my invention, it will be apparent to those skilled in the art that other embodiments, as well as modifications thereof, may be made without departing in any way from the spirit or scope of the invention for the limits of which reference must be had to the appended claims.

What is claimed is:

1. A system for counteracting the effect of gusts on the wing of an aircraft to reduce vertical acceleration of the wing due to such gusts, comprising a flap pivoted adjacent the trailing edge of the wing having a normal position in which it forms part of the airfoil contour of the wing, a reversible electric motor for selectively moving the flap about its pivot axis to positions above and below its normal position to vary the lift of the wing, a mass suspended with respect to the wing for relative vertical movement from a normal position upward or downwardly with respect to the wing upon sudden vertical acceleration of the wing, means operable by relative movement of the mass with respect to the wing in one direction to cause the motor to rotate in a direction to move the flap upwardly away from its normal position within the airfoil contour of the wing and operable by relative movement of the mass in the opposite direction to rotate the motor in its opposite direction to move the flap downwardly, and means operable by movement of the mass to its normal position from a position away therefrom and while the flap is deflected from its normal position for reversing the direction of rotation of the motor to move the flap toward its normal position and operable upon movement of the flap to its normal position to deenergize the motor whereby movement of the flap is stopped.

2. A system for counteracting the effect of gusts on the wing of an aircraft to reduce vertical acceleration of the wing due to such gusts, comprising a flap pivoted adjacent the trailing edge of the wing having a normal position in which it forms part of the airfoil contour of the wing, power-operated means for moving the flap about its pivot axis to positions above and below its normal position to vary the lift of the wing, a mass pivotally supported on the wing, means to bias the mass to an intermediate position and to permit relative vertical movement of the mass with respect to the wing upon sudden vertical acceleration of the wing, and control means operable upon downward movement of the mass with respect to the wing due to gust-produced upward acceleration of the wing to operate said power-operated means in a direction to cause said flap to move upwardly to decrease the lift of the wing and operable upon upward movement of the mass with respect to the wing due to gust-produced downward acceleration of the wing to operate said power-operated means in a direction to cause said flap to move downwardly to increase the lift of the wing.

FRED E. WEICK.

References Cited in the file of this patent

UNITED STATES PATENTS

| Number | Name | Date |
|---|---|---|
| 622,398 | Sautter | Apr. 4, 1899 |
| 672,851 | Spiller | Apr. 23, 1901 |
| 2,092,424 | Potez | Sept. 7, 1937 |
| 2,234,326 | Tiebel | Mar. 11, 1941 |
| 2,286,150 | Mercier | June 9, 1942 |
| 2,400,017 | Miles | May 7, 1946 |
| 2,416,958 | Sears | Mar. 4, 1947 |

FOREIGN PATENTS

| Number | Country | Date |
|---|---|---|
| 862,649 | France | Dec. 16, 1940 |